US012606294B2

(12) United States Patent
Way

(10) Patent No.: US 12,606,294 B2
(45) Date of Patent: Apr. 21, 2026

(54) METHOD OF REDUCING AERODYNAMIC LOADS ON AN AIRCRAFT LOCATED ON THE GROUND

(71) Applicant: Airbus Operations Limited, Bristol (GB)

(72) Inventor: Simon Way, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/820,617

(22) Filed: Aug. 30, 2024

(65) Prior Publication Data

US 2025/0074576 A1      Mar. 6, 2025

(30) Foreign Application Priority Data

Aug. 31, 2023      (GB) ...................................... 2313242

(51) Int. Cl.
*B64C 3/56*              (2006.01)
(52) U.S. Cl.
CPC ...................................... *B64C 3/56* (2013.01)
(58) Field of Classification Search
CPC .. B64C 3/56; B64C 9/14; B64C 21/02; B64C 21/08
See application file for complete search history.

(56) References Cited

U.S. PATENT DOCUMENTS

| | | | |
|---|---|---|---|
| 11,358,708 | B2 | 6/2022 | O'Rourke |
| 2004/0155157 | A1 | 8/2004 | Bray |
| 2013/0313356 | A1 | 11/2013 | Santini |
| 2020/0010177 | A1 | 1/2020 | Axford |

FOREIGN PATENT DOCUMENTS

| | | |
|---|---|---|
| EP | 2674356 A2 | 12/2013 |
| GB | 2578472 A | 5/2020 |
| WO | 2015150835 A1 | 10/2015 |

OTHER PUBLICATIONS

United Kingdom Intellectual Property Office Search and Examination Report for Application No. GB2313242.6, dated Jan. 12, 2024, 6 pages.

*Primary Examiner* — Rodney A Bonnette
(74) *Attorney, Agent, or Firm* — KDW Firm PLLC

(57)              ABSTRACT

A method for reducing aerodynamic loads on an aircraft located on the ground includes moving a wing tip relative to a fixed wing to an on-ground configuration in which the span of the wing is reduced. The wing tip includes an airflow channel, which is in an open configuration in which airflow through the channel between upper and lower surfaces of the wing tip is enabled, when the wing tip is in the on-ground configuration. This has been found to reduce aerodynamic loads on the wing tip and/or parts of the aircraft connected thereto during this phase of the aircraft's use.

20 Claims, 5 Drawing Sheets

100

METHOD OF REDUCING AERODYNAMIC LOADS ON AN AIRCRAFT LOCATED ON THE GROUND

TECHNICAL FIELD

The present disclosure relates to a method of reducing aerodynamic loads on an aircraft located on the ground. The disclosure herein also concerns an aircraft comprising a wing with a moveable wing tip including an airflow channel, and a wing for use in an aircraft located on the ground.

BACKGROUND

The maximum aircraft wing span for some aircraft, for example passenger aircraft, often is effectively limited by airport operating rules which govern various clearances required when maneuvering around the airport, such as the span and/or ground clearance required for gate entry and safe taxiway usage.

In some suggested designs, aircraft are provided with moveable wing tips which may be moved to reduce the span of the aircraft on the ground compared to when the aircraft is configured for flight. This type of arrangement per se is well known, and examples of aircraft with such moveable wing tips can be found in, for example, WO2015150835, U.S. Pat. No. 10,759,522, EP2674356B1, and U.S. Pat. No. 9,296,469.

Airflow channels for varying the lift and load characteristics of wing tips are known. Such airflow channels are used in flight, where the wing tip forms an extension of a fixed wing (for example, see U.S. Pat. No. 7,988,099). Some arrangements are also known on moveable wing tips, where the wing tip is allowed to freely move relative to the fixed wing, and the airflow channel is opened in order to adjust the loads experienced by the fixed wing and/or the wing tip (see for example GB2578472).

The disclosure herein seeks to provide an improved method of reducing aerodynamic loads on an aircraft.

SUMMARY

The disclosure herein provides, according to a first aspect, a method of reducing aerodynamic loads on an aircraft located on the ground, the aircraft having a wing, the wing comprising a fixed wing and a moveable wing tip mounted at an end of the fixed wing, and the wing tip comprising an airflow channel extending between upper and lower surfaces of the wing tip, wherein the airflow channel has a closed configuration in which airflow through the channel between the upper and lower surfaces of the wing tip is restricted, and an open configuration in which airflow through the channel between the upper and lower surfaces of the wing tip is enabled, and wherein the method comprises the steps of: moving the wing tip relative to the fixed wing from a flight configuration, to an on-ground configuration in which the span of the wing is reduced; and having the channel in the open configuration when the wing tip is in the on-ground configuration.

Providing the airflow channel in the open configuration, when the wing tip is in the on-ground configuration, has been found to be beneficial because it can reduce aerodynamic loads on the wing tip (and/or parts of the aircraft connected thereto) during this phase of the aircraft's use. Thus, aspects of the disclosure herein recognize that it may be beneficial to have a reduced wing span and an open airflow channel, thereby reducing aerodynamic loads on an aircraft while it is on the ground. This is a departure from the accepted thinking of only considering the management of the aerodynamic loads generated by the wing tip during flight. By reducing the loads experienced by the aircraft on the ground, components of reduced size, mass and/or complexity may be used. For example, a hinge coupled between the wing tip and the fixed wing may be reduced in size, mass and/or complexity.

With the wing tip in the on-ground configuration, the span of the wing is reduced. This may be to ensure the span of the wing is less than, or substantially equal to, an airport compatibility limit. The airport compatibility limit is a span limit (for example relating to clearance restrictions for buildings, signs, other aircraft). The compatibility limit is preferably a gate limit. In this way, an aircraft can have a large span (exceeding gate limits) during flight, but still be able to comply with gate limits on the ground.

The wing tip may be rotatably attached to the fixed wing. In this way, moving the wing tip from the flight configuration to the on-ground configuration may comprise rotating the wing tip relative to the fixed wing. The rotation may, for example, be about a hinge.

The wing tip may be a wing tip extension, for example a generally planar tip extension. In other embodiments, the wing tip may comprise, or consist of, a non-planar device, such as a winglet.

In the flight configuration the trailing edge of the wing tip may be a continuation of the trailing edge of the fixed wing. The leading edge of the wing tip may be a continuation of the leading edge of the fixed wing, such that there is a smooth transition from the fixed wing to the wing tip. It will be appreciated that there may be a smooth transition, even where there are changes in sweep or twist at the fixed wing/wing tip junction. However, there are preferably no discontinuities at the junction between the fixed wing and wing tip. The junction between the fixed wing and wing tip may extend transversely, or substantially perpendicular to a spanwise direction of the wing, which may as in some embodiments described below facilitate efficient arrangement of mechanisms and/or control systems for moving the wing tip. Alternatively, the junction between the fixed wing and wing tip may extend in another direction, for example along a chordwise direction of the wing, which in some embodiments may be generally aerodynamically favorable and easier to seal against leakage of airflow between top and bottom surfaces of the wing in flight. At least at the root of the wing tip, and preferably along the length of the wing tip, the upper and lower surfaces of the wing tip may be continuations of the upper and lower surfaces of the fixed wing.

The span ratio of the fixed wing relative to the wing tip may be such that the fixed wing comprises at least 60%, 70%, 80%, 90%, or more, of the overall span of the wing. The fixed wing may comprise a wing root fixedly mounted to an aircraft body. In alternative embodiments, the fixed wing may be movably connected to an inboard further wing portion, the latter fixedly mounted to the aircraft body, providing a wing assembly with more than two relatively movable sections.

The airflow channel may be a slot in the wing tip. In the open configuration, the airflow channel may permit fluid communication between a lower aperture on the lower surface of the wing tip and an upper aperture on the upper surface of the wing tip. The upper and lower surfaces of the wing tip may be defined with reference to their orientations in the flight configuration. In the on-ground configuration, the upper surface of the wing tip may face inboard the aircraft, and the lower surface of the wing tip may face outboard the aircraft.

The airflow channel may comprise upper and lower doors for opening and closing the airflow channel. The upper and lower doors may be located adjacent to upper and lower apertures of the wing tip respectively. With the airflow channel in the closed configuration, the upper and lower doors may substantially seal the upper and/or lower apertures respectively. Restricted airflow may mean entirely prevented, or substantially reduced when compared to the open configuration. With the airflow channel in the open configuration, the upper and lower doors may substantially open the upper and lower apertures respectively. Enabled airflow may mean entirely unrestricted, in that the entirety or majority of the airflow channel is open to airflow through the channel. Configuring the airflow channel between the closed and open configurations may comprise moving the upper and lower doors to seal and unseal the airflow channel. It will be appreciated that across different embodiments of the disclosure herein, the airflow channel may switch between the open and closed configurations in a number of ways. For example, movement of the upper and lower doors between the closed and open configurations of the airflow channel may comprise the upper and lower doors rotating, translating and/or folding relative to the wing tip.

The flight configuration may comprise the wing tip forming an extension of the fixed wing. In other words, in the flight configuration, the upper and lower surfaces of the wing tip may be continuations of upper and lower surfaces of the fixed wing. In some embodiments the wing tip may be moveable, during flight, to a load-alleviating configuration. For example, the wing tip may be actuatable, or be allowed to rotate relative to the fixed wing under the action of aerodynamic forces, away from the flight configuration, to a load-alleviating configuration. In the load-alleviating configuration, the wing tip may be positioned such that the loads on the fixed wing are reduced.

It may be that the method is performed when the aircraft is taxiing or stationary. Taxiing may comprise the entirety or a portion of the duration in which the aircraft is moving once on the ground. Stationary may comprise when the aircraft is parked on the ground, for example at an aircraft gate.

It may be that in the on-ground configuration the wing tip is locked in position. Locking the wing tip in position may prevent relative movement between the wing tip and the fixed wing.

When the wing tip is in the on-ground configuration, an aircraft incorporating the wing, may be unsuitable for flight. For example, the wing tip may be aerodynamically and/or structurally unsuitable for flight in the on-ground configuration. The aircraft is preferably configured such that, during flight, the wing tip is not moveable to the on-ground configuration. The aircraft may comprise a sensor for sensing when the aircraft is in flight. When the sensor senses that the aircraft is in flight, a control system is preferably arranged to disable the possibility of moving the wing tip to the on-ground configuration. In the on-ground configuration the wing tip may be held in place. For example, the wing tip may be latched or locked in place to prevent movement back towards the flight configuration.

The actuation devices may comprise actuators that take any of a wide variety of forms and may for example be any suitable kind of gas, hydraulic or electric drive. Many alternative implementations of the actuation assembly will be apparent to the ordinarily skilled person.

It may be that in the on-ground configuration the wing tip is moved upwards relative to the fixed wing. The on-ground configuration may comprise the wing tip being moved upwards or downwards relative to the fixed wing. Movement of the wing tip upwards tends to be preferred because it improves the ground clearance of the aircraft compared with moving the wing tip downwards.

In the on-ground configuration, the wing tip may be moved upwards relative to the fixed wing by optionally at least 10 degrees, optionally at least 20 degrees, optionally at least 30 degrees, optionally at least 45 degrees, optionally at least 60 degrees, optionally at least 90 degrees and optionally up to 120 degrees. The angle may depend on gate limits and/or the aerodynamic forces exerted on the wing when the aircraft is on the ground.

The step of moving the wing tip from the flight configuration to the on-ground configuration may occur before, during or after the step of having the channel in the open configuration. For example, the wing tip may first be moved to the on-ground configuration, and then the airflow channel arranged in the open configuration. There may be a time delay between the two steps. Alternatively, the two steps may be coincident, or partially overlapping. For example, the airflow channel may be opened once the wing tip has moved, or the airflow channel may begin opening once the wing tip has begun moving. As a further alternative, the airflow channel may be in the open configuration before the wing tip is moved to the on-ground configuration.

According to a second aspect of the disclosure herein there is also provided an aircraft, the aircraft comprising a wing, the wing comprising a fixed wing and a moveable wing tip mounted at an end of the fixed wing, wherein the wing tip is moveable relative to the fixed wing from a flight configuration, to an on-ground configuration in which the span of the wing is reduced, the wing tip comprising an airflow channel extending between upper and lower surfaces of the wing tip, wherein the airflow channel has a closed configuration in which airflow through the channel between the upper and lower surfaces of the wing tip is restricted, and an open configuration in which airflow through the channel between the upper and lower surfaces of the wing tip is enabled, and wherein the aircraft is located on the ground, the wing tip is in the on-ground configuration and the airflow channel is in the open configuration. The second aspect of the disclosure herein recognizes the benefit of using the airflow channel when the aircraft is located in-situ on the ground.

The length of the wing tip as defined along a midpoint of the wing may optionally be at least 5%, optionally at least 10% of the length of the wing, optionally at least 15%, optionally at least 20%, optionally at least 25%, optionally at least 30%, optionally at least 35% and optionally at least 40% of the length of the wing.

The length of the wing tip as defined along a midpoint of the wing may be no more than 60% of the length of the wing, optionally no more than 40%, optionally no more than 30% and optionally no more than 20% of the length of the wing.

The length of the wing tip as defined along a midpoint of the wing may optionally be at least 1.0 m, optionally at least 2.5 m, optionally at least 3.0 m, optionally at least 4.0 m, optionally at least 5.0 m, optionally at least 6.0 m, optionally at least 7.0 m and optionally at least 20.0 m.

The length of the wing tip as defined along a midpoint of the wing may be no more than 20.0 m, optionally no more than 15.0 m, optionally no more than 10.0 m, optionally no more than 8.0 m, optionally no more than 7.0 m, optionally no more than 6.0 m and optionally no more than 5.0 m.

The length of the wing from root to tip in the flight configuration (in particular, but not, exclusively for a two-engine aircraft) as measured along the midpoint of the wing may be at least 5 m, optionally at least 15 m, optionally at least 20 m, optionally at least 25 m, optionally at least 30 m, optionally at least 35 m, optionally at least 40 m, optionally at least 45 m and optionally at least 60 m. It is envisaged that the aircraft wing of the disclosure herein may facilitate the use of longer and optionally larger area movable wing tips.

The aircraft wing may be for use in an aircraft optionally having an operating empty weight of at least 20,000 kg, optionally at least 25,000 kg, optionally at least 30,000 kg, optionally at least 40,000 kg, optionally at least 100,000 kg and optionally at least 300,000 kg.

It may be that the aircraft further comprises an actuator for moving the wing tip between the flight and on-ground configurations.

It may be that the aircraft further comprises a lock for locking the wing tip in the on-ground configuration.

It may be that in the on-ground configuration, the wing tip is moved upwards from the flight configuration relative to the fixed wing.

According to a third aspect of the disclosure herein there is also provided an aircraft, the aircraft comprising a wing, the wing comprising: a fixed wing and a moveable wing tip mounted at an end of the fixed wing, wherein the wing tip is moveable relative to the fixed wing from a flight configuration, to an on-ground configuration in which the span of the wing is reduced, the wing tip comprising an airflow channel extending between upper and lower surfaces of the wing tip, wherein the airflow channel has a closed configuration in which airflow through the channel between the upper and lower surfaces of the wing tip is restricted, and an open configuration in which airflow through the channel between the upper and lower surfaces of the wing tip is enabled, wherein the airflow channel is in the open configuration when the wing tip is locked in the on-ground configuration.

It may be that the airflow channel is in the open configuration and the wing tip is locked in the on-ground configuration when the aircraft is on the ground.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1:
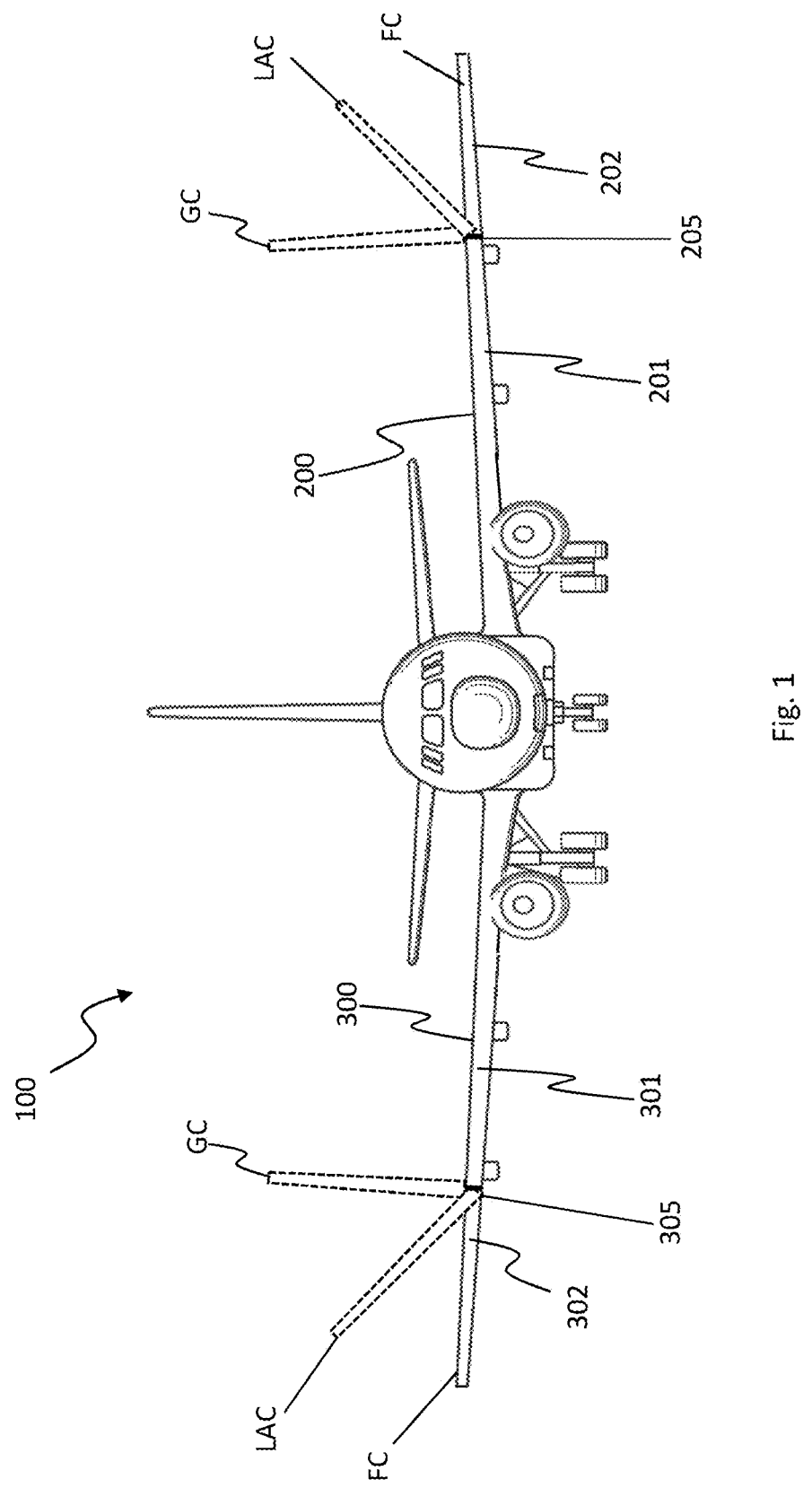
FIG. 1 shows a front-on view of an aircraft.
Figure 2:
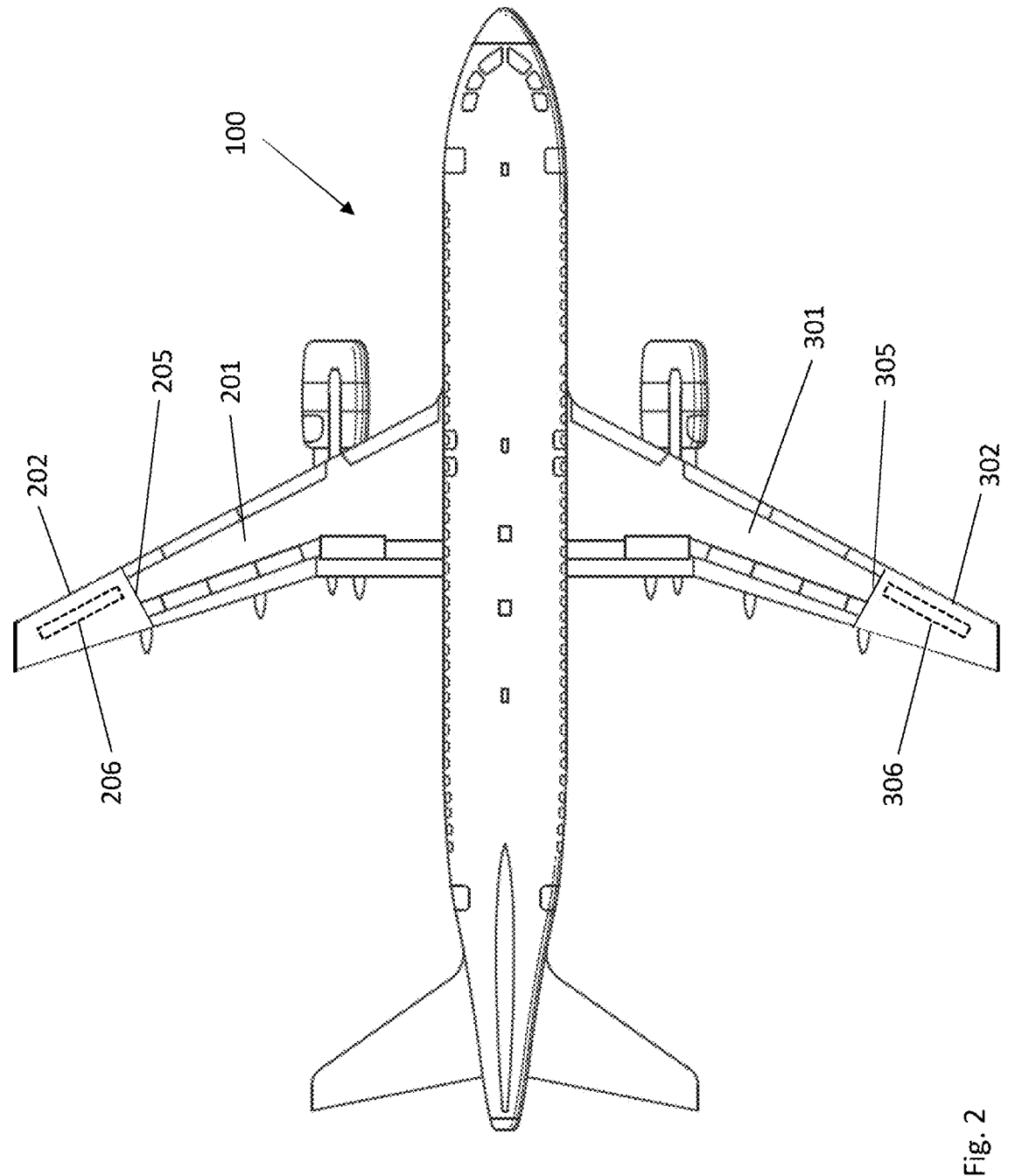
FIG. 2 shows a plan view of the aircraft of FIG. 1 with a wing tip in a flight configuration.

An example of an aircraft according to a first embodiment, is shown in FIGS. 1 and 2. The aircraft is denoted generally by reference numeral 100 and comprises two aircraft wings 200, 300. Each wing 200, 300 comprises a fixed wing 201, 301 and a wing tip 202, 302 mounted at an end of the fixed wing 201, 301. Each wing tip 202, 302 is moveable relative to the respective fixed wing 201, 301 about a hinge axis 205, 305. Referring to FIG. 1, each wing 200, 300 is operable in a flight configuration (FC) for use during flight in which the wing tip 202, 302 forms an extension of the fixed wing 201, 301. The wing tip is also moveable to a load-alleviating configuration (LAC) wherein the wing tip 202, 302 is rotated about the hinge axis 205, 305 by an actuator (not shown), such that the load on the root of the wing 200, 300 is reduced. While the load-alleviating configuration (LAC) is illustrated in FIG. 1 when the aircraft is on the ground it will be appreciated that this configuration is only adopted when the aircraft is in flight.

Each wing 200, 300 is also operable in an on-ground configuration (GC) in which the wing span of the aircraft 100 is reduced (compared to the flight-configuration) so that the aircraft 100 can comply with airport gate limits. In the example shown, each wing tip 202, 302 in the on-ground configuration (GC) is shown rotated upwards by approximately 90 degrees relative to the flight configuration (FC) in which each wing tip 202, 302 forms an extension of the fixed wing 201, 301. In other words, each wing tip 202, 302 in the on-ground configuration (GC) is substantially perpendicular to each fixed wing 301, 302.

Referring to FIG. 2, the aircraft 100 is shown in the flight configuration (FC) with each wing tip 202, 302 forming an extension of the fixed wing 201, 301. Each wing tip 202, 302 includes an airflow channel 206, 306, which extends in a spanwise direction along a portion of each wing tip 202, 302. Each airflow channel 206, 306 is shorter and narrower than each wing tip 202, 302. When each airflow channel 206, 306 is open, it forms a passage between upper and lower surfaces of the wing tip 202, 302 through which air may freely flow.

Figure 3:
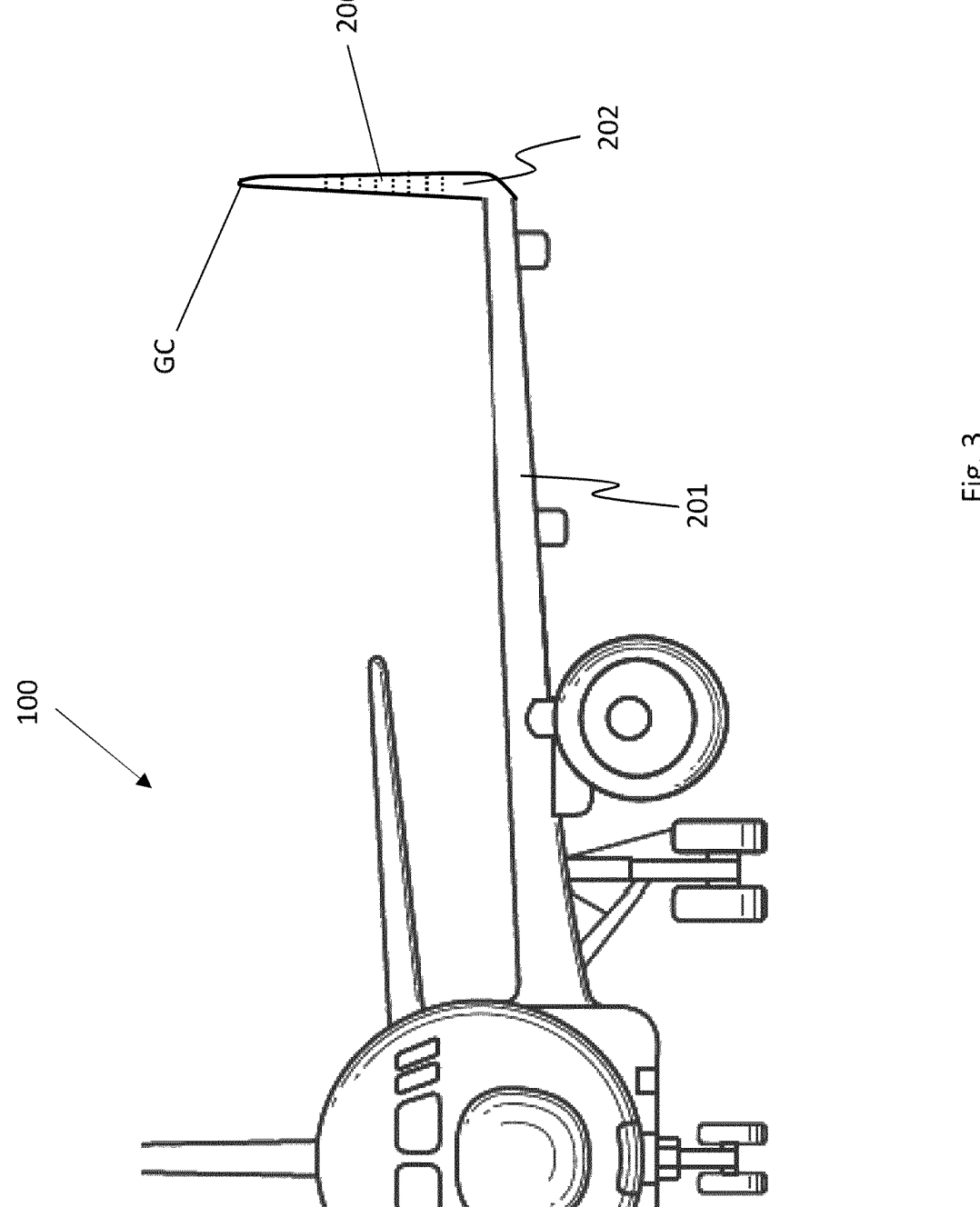
FIG. 3 shows an example of an embodiment of an aircraft on the ground, with a wing tip in an on-ground configuration and an airflow channel in an open configuration.

Referring to FIG. 3, one half of the aircraft 100 is shown in the on-ground configuration (GC). The aircraft is stationary and is located at an aircraft gate. The wing tip 202 is rotated upwards by approximately 90 degrees relative to the fixed wing 201, from the flight configuration (FC). The airflow channel 206 is shown as a region including broken lines, extending between upper and lower surfaces of the wing tip 202, which substantially face the inboard and outboard aspects of the aircraft 100 respectively due to the rotation of the wing tip 202.

With the airflow channel 206 open in the on-ground configuration (GC), air may flow through the channel between the upper and lower surfaces of the wing tip 202. The wing tip will therefore present a smaller area for generating aerodynamic loads caused by environmental conditions on the ground (such as prevailing winds and associated gusts). In that respect, the exact direction of the airflow through the channel will depend on the environmental conditions and the prevailing wind/gust direction, and in principle could be in either direction through the air flow channel depending on those conditions.

By presenting an open channel when the aircraft is on the ground, aerodynamic loads on the wing tip 202 are reduced, which in turn reduces loads transmitted to the hinge, actuator, fixed wing 201 and/or other parts of the aircraft 100. Thus, aspects of the disclosure herein recognize that it may be beneficial to have an open airflow channel, on an aircraft wing tip while that aircraft is on the ground and the wing tip is in the on-ground configuration. This is a departure from the accepted thinking of only considering the management of the loads generated by the wing tip during flight.

Figure 4:
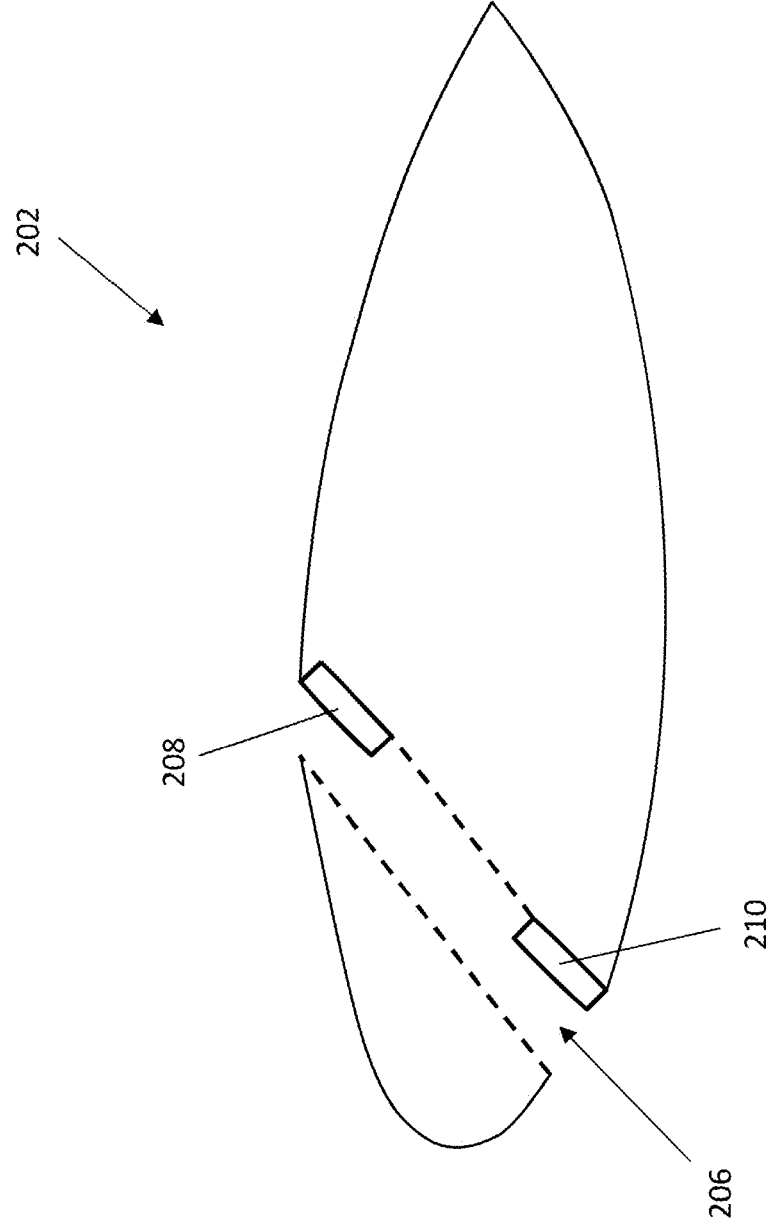
FIG. 4 shows an example of an embodiment of a cross-section of a wing tip.

FIG. 4 shows a cross-section of the wing tip 202. The wing tip 202 has an aerofoil shape, and includes an airflow channel 206 shown in broken lines, extending between lower and upper surfaces of the wing tip 202. Upper door 208 and lower door 210 are adjacent to the upper and lower ends of the airflow channel 206 respectively. The upper and lower doors 208, 210 are shown pivoted inward towards the interior of the wing tip 202, to open the airflow channel 206 and enable the passage of air therethrough. The upper door 208 is located aft of the lower door 210 with reference to the chord line of the wing tip 202.

In other embodiments, it will be appreciated that the airflow channel 206 and/or the upper and lower doors 208, 210 may be arranged in other ways. For example, the doors may be located at substantially the same length along the chord line of the wing tip 202, such that the airflow channel 206 extends in a direction substantially perpendicular to the chord line of the wing tip 202. Alternatively, the upper door 208 may be located forward of the lower door 210.

Upper and lower doors 208, 210 are shown in the same cross-section, in that they at least partially overlap in a spanwise direction along the wing tip 202. In other embodiments, the upper and lower doors 208, 210 may be staggered in a spanwise direction along the wing tip 202, such that the airflow channel 206 comprises a spanwise extension along the wing tip 202.

Figure 5:
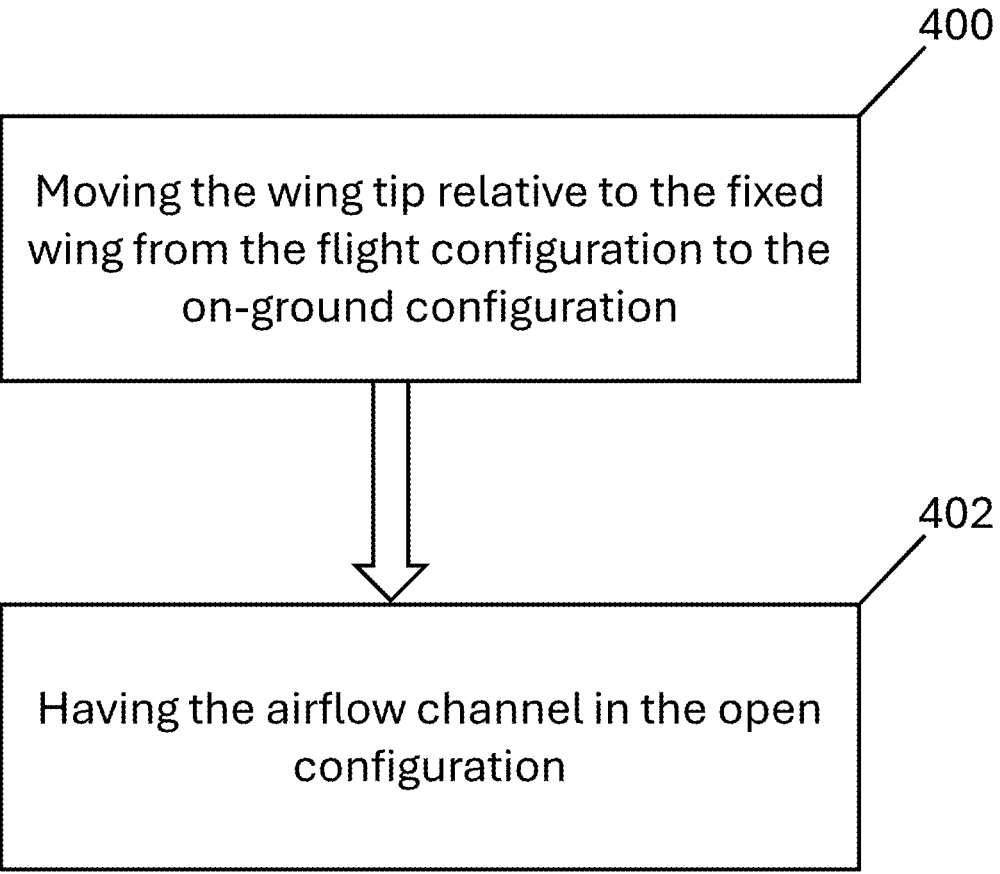
FIG. 5 shows an example flow diagram of steps of reducing aerodynamic loads on an aircraft located on the ground.

FIG. 5 is a schematic diagram showing the steps of operating the aircraft 100 according to FIGS. 1-3. Thus there is a step 400 of moving the wing tip 202 relative to the fixed wing 201 from the flight configuration (FC) to the on-ground configuration (GC) in which the span of the wing 200 is reduced. There is a step 402 of having the airflow channel 206 in the open configuration. In the diagram, the two steps are shown as consecutive. It will be appreciated that the order of the steps may be reversed, and/or that the steps may be partially or wholly synchronised.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described. The example of the aircraft described above in relation to FIGS. 1 to 5 describes a wing tip that is substantially perpendicular to the fixed wing in the on-ground configuration. Those skilled in the art will realise that the aircraft may have a wing tip that is movable to a range of angles relative to the fixed wing in the on-ground configuration, providing that the span of the wing is reduced. The example of the wing tip described above in relation to FIG. 4 describes an airflow channel opened via pivoting doors. Those skilled in the art will realise that the airflow channel may be opened by other means, such as sliding doors, spoilers and/or louvers. The example of the aircraft described above in relation to FIGS.

1 to 5 describes an aircraft which is stationary (i.e. parked). Those skilled in the art will realise that the description is equally applicable to an aircraft which is taxiing (i.e. moving across the ground).

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

It should be understood that modifications, substitutions, and alternatives of the invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of reducing aerodynamic loads on an aircraft located on ground, the aircraft having a wing comprising:
   a fixed wing; and
   a moveable wing tip mounted at an end of the fixed wing, the wing tip comprising an airflow channel extending between upper and lower surfaces of the wing tip;
   wherein the airflow channel has a closed configuration, in which airflow through the channel between the upper and lower surfaces of the wing tip is restricted, and an open configuration, in which airflow through the channel between the upper and lower surfaces of the wing tip is enabled;
   the method comprising:
   providing the aircraft on the ground;
   moving the wing tip relative to the fixed wing into an on-ground configuration, in which a span of the wing is reduced relative to a flight configuration of the wing tip; and
   opening the airflow channel into the open configuration while the wing tip is in the on-ground configuration to reduce the aerodynamic loads on the aircraft.

2. The method according to claim 1, wherein, in providing the aircraft on the ground, the aircraft is taxiing or stationary.

3. The method according to claim 1, wherein, when in the on-ground configuration and while the aircraft is on the ground, the wing tip is locked in position.

4. The method according to claim 1, wherein moving the wing tip into the on-ground configuration comprises moving the wing tip upwards relative to the fixed wing.

5. The method according to claim 1, wherein the reduced span of the wing when the wing-tip is in the on-ground configuration is less than or equal to an airport compatibility limit.

6. The method according to claim 5, wherein the airport compatibility limit is a wing span limit for aircraft at a gate, which is a gate limit, and, during flight and while the wing tip is in the flight configuration, the span of the wing exceeds the gate limit.

7. The method according to claim 1, wherein, in the flight configuration, a trailing edge of the wing tip is a continuation or extension of the trailing edge of the fixed wing, such that there is a smooth transition from the fixed wing to the wing tip.

8. The method according to claim 7, wherein:
there is a change in sweep or twist at a junction between the fixed wing and the wing tip, the junction being where the wing tip meets the fixed wing; and
there are no discontinuities between the trailing edge of the wing tip and the trailing edge of the fixed wing at the junction.

9. The method according to claim 1, wherein, in the flight configuration, a leading edge of the wing tip is a continuation or extension of the leading edge of the fixed wing, such that there is a smooth transition from the fixed wing to the wing tip.

10. The method according to claim 9, wherein:
there is a change in sweep or twist at a junction between the fixed wing and the wing tip, the junction being where the wing tip meets the fixed wing; and
there are no discontinuities between the leading edge of the wing tip and the leading edge of the fixed wing at the junction.

11. The method according to claim 1, wherein:
the wing tip is joined to and meets the fixed wing at a junction; and
the junction extends perpendicularly to a wingspan direction of the fixed wing.

12. The method according to claim 1, wherein:
the wing tip is joined to and meets the fixed wing at a junction; and
the junction extends parallel to a chordwise direction of the fixed wing.

13. The method according to claim 1, wherein, at least at a root of the wing tip, the upper and lower surfaces of the wing tip are continuations of upper and lower surfaces of the fixed wing.

14. The method according to claim 1, wherein, along an entirety of a length of the wing tip, the upper and lower surfaces of the wing tip are continuations of upper and lower surfaces of the fixed wing.

15. The method according to claim 1, wherein:
the aircraft comprises an aircraft body, in a form of a passenger cabin fuselage;
the fixed wing comprises a wing root fixedly mounted to the aircraft body;
the wing comprises a further wing portion, which is movably connected to the wing root at a first, inboard end of the further wing portion; and
the wing tip is pivotally connected to the further wing portion at a second, outboard end of the further wing portion, such that the wing is a wing assembly with more than two relatively movable sections.

16. The method according to claim 1, wherein:
when the wing tip is in the on-ground configuration, the aircraft is unsuitable for flight because the wing is aerodynamically and/or structurally unsuitable for flight when the wing tip is in the on-ground configuration; and
the aircraft comprises a sensor configured for sensing when the aircraft is in flight;

the method comprising using the sensor to determine when the aircraft is in flight and preventing the wing tip from moving into the on-ground configuration.

17. The method according to claim 16, comprising using a control system of the aircraft and based on a determination by the sensor that the aircraft is in flight, disabling a possibility of the wing tip moving into the on-ground configuration.

18. The method according to claim 1, wherein, as the wing tip moves into the on-ground configuration, the wing tip rotates relative to the fixed wing by 120°.

19. The method according to claim 1, wherein the wing tip is moved relative to the fixed wing into the on-ground configuration before the channel is opened into the open configuration.

20. A method of reducing aerodynamic loads on an aircraft located on ground, the aircraft having and aircraft body, in a form of a passenger cabin fuselage, and a wing, the wing comprising:
a fixed wing comprising a wing root fixedly mounted to the aircraft body;
a further wing portion, which is movably connected to the wing root at a first, inboard end of the further wing portion;
a moveable wing tip pivotably connected to the further wing portion at a second, outboard end of the further wing portion, such that the wing is a wing assembly with more than two relatively movable sections, wherein the wing tip is attached at an end of the further wing portion to form a junction between the wing tip and the further wing portion, the wing tip comprising an airflow channel extending between upper and lower surfaces of the wing tip;
a sensor for sensing when the aircraft is in flight; and
a control system;
wherein the airflow channel has a closed configuration, in which airflow through the channel between the upper and lower surfaces of the wing tip is restricted, and an open configuration, in which airflow through the channel between the upper and lower surfaces of the wing tip is enabled;
the method comprising:
providing the aircraft on the ground, wherein the aircraft is taxiing or stationary;
moving the wing tip upwards, relative to the further wing portion into an on-ground configuration, in which a span of the wing is reduced relative to a flight configuration of the wing tip;
opening the airflow channel into the open configuration while the wing tip is in the on-ground configuration to reduce the aerodynamic loads on the aircraft;
using the sensor to determine when the aircraft is in flight and preventing the wing tip from moving into the on-ground configuration; and
using the control system of the aircraft and based on a determination by the sensor that the aircraft is in flight, disabling a possibility of the wing tip moving into the on-ground configuration;
wherein, when in the on-ground configuration and while the aircraft is on the ground, the wing tip is locked in position;
wherein the reduced span of the wing when the wing-tip is in the on-ground configuration is less than or equal to a wing span limit for aircraft at a gate, which is a gate limit, and, during flight and while the wing tip is in the flight configuration, the span of the wing exceeds the gate limit;

wherein, in the flight configuration:

a trailing edge of the wing tip is a continuation or extension of the trailing edge of the further wing portion, such that there is a smooth transition from the further wing portion to the wing tip; or a leading edge of the wing tip is a continuation or extension of the leading edge of the further wing portion, such that there is a smooth transition from the further wing portion to the wing tip;

wherein the junction extends perpendicularly to a wing-span direction of the further wing portion or parallel to a chordwise direction of the further wing portion;

wherein, at least at a root of the wing tip, the upper and lower surfaces of the wing tip are continuations of upper and lower surfaces of the further wing portion;

wherein, when the wing tip is in the on-ground configuration, the aircraft is unsuitable for flight because the wing is aerodynamically and/or structurally unsuitable for flight when the wing tip is in the on-ground configuration;

wherein, as the wing tip moves into the on-ground configuration, the wing tip rotates relative to the fixed wing by more than 90°; and wherein the wing tip is moved relative to the fixed wing into the on-ground configuration before the channel is opened into the open configuration.

* * * * *